(No Model.)
W. M. BROWN.
ELECTRIC CONTACT SHOE.
No. 602,495. Patented Apr. 19, 1898.
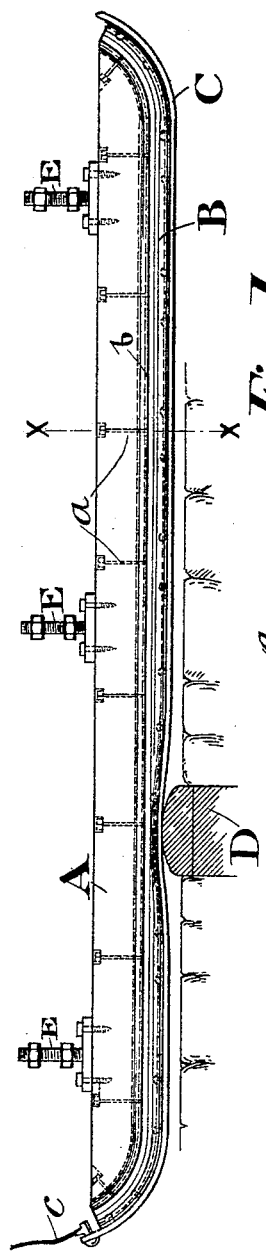
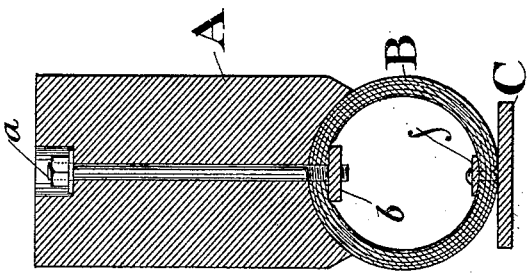
WITNESSES:
INVENTOR
W. Milt Brown
BY Richard Eyre
ATTORNEY.

United States Patent Office.

WILLIAM MILTON BROWN, OF JOHNSTOWN, PENNSYLVANIA, ASSIGNOR TO THE JOHNSON COMPANY, OF LORAIN, OHIO.

ELECTRIC CONTACT-SHOE.

SPECIFICATION forming part of Letters Patent No. 602,495, dated April 19, 1898.

Application filed November 14, 1896. Serial No. 612,083. (No model.)

*To all whom it may concern:*

Be it known that I, WILLIAM MILTON BROWN, of Johnstown, in the county of Cambria, State of Pennsylvania, have invented certain new and useful Improvements in Electric Contact-Shoes, of which the following is a specification.

My invention relates to electric contact-shoes, and is especially applicable for use in connection with that class of electric railways having non-continuous contacts placed in the road-bed and adapted to deliver current to a suitable mechanism carried by the car. Contacts of this character are shown and described in Letters Patent No. 558,151, issued to me on April 14, 1896.

The object of my invention is to provide an inexpensive, flexible, and durable collecting-shoe which shall be thoroughly effective and substantially noiseless in operation; and to that end my invention consists, broadly, in the use of a substantially continuous piece of flexible material to which is attached a metallic contact-strip. I prefer to use a piece of heavy rubber hose as the said flexible material.

Referring to the drawings, Figure 1 represents a side view of a contact-shoe embodying the features of my invention and portions of a railway. Fig. 2 shows a vertical section on the line X X of Fig. 1.

A is a block of wood or other suitable material and is secured by the bolts E E to any desired parts of the car frame or truck. Each of the bolts E E carries two nuts to adapt the shoe to be adjustably secured at any desired height.

B is a piece of heavy rubber hose which extends longitudinally throughout the length of the shoe, with its upper side fitting in the lower concave face of the block A.

C is a strip of metal secured to the under side of the hose and adapted to make contact with the contact-box, as D.

$c$ is a wire electrically connecting the contact-strip with the apparatus upon the car.

My method of securing the block A, the hose B, and the contact-strip C together in their proper operative positions is as follows: Rivets $ff$, preferably of copper, are brazed upon the side of the strip C which is to be adjacent to the hose. Holes are then made in the hose to admit the rivet ends. Another set of holes is made in the hose immediately over the rivet ends and washers are put about said rivets. The ends of the rivets are then hammered down to form a head in the usual manner.

$aa$ are bolts which pass downwardly through the block A and the hose B and screw into threaded holes in a continuous strip $b$, which extends inside the hose against its upper side and continuous throughout its length.

I do not wish to limit myself to the exact construction here shown nor to the use of my contact-shoe with any particular method of electrical distribution nor with any particular form of contact used therewith.

I especially point out that it is not essential to use a continuous hose, as the piece might be cut into a plurality of sections. It is also possible to use a solid piece of rubber or suitable material in place of the hose B.

What I claim, and desire to protect by Letters Patent, is—

1. In an electric contact-shoe, a continuous contact member in combination with a continuous elastic member secured thereto.

2. In an electric contact-shoe, a continuous piece of rubber tubing adapted to carry the contact portion of the shoe and afford the requisite yielding contact between said contact portions and the devices from which the electric current is delivered to the shoe.

3. In an electric contact-shoe, a flexible member secured longitudinally to the vehicle and composed substantially of a piece of rubber tubing, and a continuous contact-strip, secured to said tubing substantially as set forth.

4. A contact-shoe for railway-vehicles comprising a flexible contact-strip, a supporting-frame comprising a bar parallel to said strip, and a cushion extending from end to end between said bar and strip.

5. In an electric contact-shoe, in combination, a continuous piece of flexible tubing, a plurality of rivets passing through one wall thereof, and secured upon the top of a continuous contact-strip, said rivets securing said strip tangentially to the tubing.

6. An electric contact-shoe comprising, in combination, a continuous rigid member, secured longitudinally to the vehicle, a continuous yielding member rigidly secured thereto and a flexible contact-strip secured to said yielding member.

7. A contact-shoe for electric railways comprising the block A secured to the vehicle to be propelled, the hose B secured to one side of said block, and the contact-strip C secured to said hose.

In testimony whereof I have affixed my signature in presence of two witnesses.

WILLIAM MILTON BROWN.

Witnesses:
RALPH RICHARDSON,
H. W. SMITH.